United States Patent [19]

Matsumoto

[11] Patent Number: 5,551,931
[45] Date of Patent: Sep. 3, 1996

[54] METHOD OF AND SYSTEM FOR GEAR SHIFT CONTROLLING FOR AN AUTOMATIC TRANSMISSION

[75] Inventor: Akio Matsumoto, Hiroshima, Japan

[73] Assignee: Mazda Motor Corporation, Hiroshima-ken, Japan

[21] Appl. No.: 109,485

[22] Filed: Aug. 20, 1993

[30] Foreign Application Priority Data

Aug. 20, 1992 [JP] Japan .................................. 4-245914

[51] Int. Cl.⁶ .................................................. B60K 41/06
[52] U.S. Cl. ........................................ 477/149; 477/155
[58] Field of Search ............................ 477/70, 71, 143, 477/149, 155

[56] References Cited

U.S. PATENT DOCUMENTS

| | | | |
|---|---|---|---|
| 3,747,439 | 7/1974 | Uozumi et al. | 477/143 |
| 3,832,915 | 9/1974 | Hiramatsu | 477/143 |
| 4,517,859 | 5/1985 | Nagaoka et al. | 477/143 |
| 5,235,876 | 8/1993 | Minowa | 364/424.1 X |

FOREIGN PATENT DOCUMENTS

| | | | |
|---|---|---|---|
| 62-147153 | 7/1987 | Japan . | |
| 63-186056 | 8/1988 | Japan . | |
| 1199049 | 8/1991 | Japan | 477/149 |
| 3249471 | 11/1991 | Japan | 477/143 |
| 4345539 | 12/1992 | Japan | 477/143 |

*Primary Examiner*—Charles A. Marmor
*Assistant Examiner*—Nathan O. Jensen
*Attorney, Agent, or Firm*—Keck, Mahin & Cate

[57] ABSTRACT

An automobile automatic transmission shift control system causes a specific gear shift by locking a first frictional element and unlocking a second frictional element simultaneously. The system delays a commencement of the unlocking of the second frictional element relative to a commencement of the locking of the first frictional element during the specific gear shift while a down control of engine torque is not conducted or when an engine output torque is large.

4 Claims, 7 Drawing Sheets

METHOD OF AND SYSTEM FOR GEAR SHIFT CONTROLLING FOR AN AUTOMATIC TRANSMISSION

BACKGROUND OF THE INVENTION

1. Field of the Invention

The present invention relates to a gear shift control system of an automatic transmission installed in an automobile and, more particularly, to an automatic transmission gear shift control system in which, at the same time that a first frictional element of a plurality of frictional elements is coupled, a second frictional element is released or unlocked. The invention also relates to a method for performing such a gear shift control.

Typically, an automatic transmission installed in an automobile combines a torque converter and a transmission-gear mechanism and is provided with a plurality of frictional elements, such as brakes and clutches, which switch the torque transmission paths of the transmission-gear mechanism. The transmission also typically includes a hydraulic circuit which controls the application of hydraulic pressure for engagement to the frictional elements and the release of hydraulic pressure from them. Such an automatic transmission is designed to shift gears automatically according to driving conditions by conducting selective application of hydraulic pressure for engagement to the plurality of frictional elements which is performed by pre-designed operation of shift valves in the hydraulic circuit.

With regard to this type of automatic transmission, as disclosed, for example, in Japanese Unexamined Patent Publication No 63-186056, one of a plurality of frictional elements, i.e. a first frictional element, engages at the same time that another or second frictional element releases, thereby completing shifting between the specified gears as a result of transmitting torque from the second frictional element to the first frictional element.

In the above automatic transmission, one of a plurality of frictional elements, namely a first frictional element, engages at the same time that another, or second, frictional element releases in order to execute the specified gear shifting. It is important to timely manage the engagement action of the first frictional element and the release action of the second frictional element. In particular, when the timing is not proper relative to the input into the automatic transmission, that is, the output of the engine, what is called a "shift shock" occurs.

To understand the drawback of the prior art automatic transmissions, reference is made to FIG. 1. If the commencement of release of the second frictional element is earlier than the commencement of engagement of the first frictional element as indicated by a solid line, then torque transfer is conducted in a state where the engaging or locking force for these frictional elements is comparatively small, that is, in a state where a transmission mechanism is rather close to neutral, as shown by an arrow a. As a result, when an input torque from the engine is particularly large, both frictional elements become unable to withstand this input torque, and racing of the engine occurs. In contrast, if the commencement of the release action of the second frictional element is slower than the commencement of engagement of the first frictional element as indicated by a broken line, then torque transfer is conducted in a state where the engagement or locking force for these frictional elements is comparatively large, that is, in a state where the transmission mechanism is rather close to a double-lock condition, as shown by an arrow b. When the input from the engine is small, therefore, the output torque from the automatic transmission to the driving wheels drops, so that a shift shock occurs.

SUMMARY OF THE INVENTION

It is an object of the present invention to provide a method of and system for gear shift controlling an automobile automatic transmission in which, at the time of gear shifting by simultaneous engagement or locking of the first frictional element and release or unlocking of the second frictional element, the timing of locking and unlocking actions is properly set, according to engine output, so as to suppress racing of engine when engine output is large and a shift shock when engine output is small, thereby constantly conducting proper gear shifting operations.

The above object of the present invention is achieved by providing a method of and a system for gear shift controlling for an automobile automatic transmission having a plurality of hydraulically operated frictional elements which are selectively locked and unlocked so as to automatically provide a desired gear. In particular, a specific gear shift, for instance a second-to-third gear shift-up, is performed by locking a first specific hydraulically operated frictional element simultaneously with unlocking a second specific hydraulically operated frictional element. The shift control system delays commencement of the unlocking of the second specific hydraulically operated frictional element relative to a commencement of the locking of the first specific hydraulically operated frictional element during the specified gear shift.

When an engine is controlled so as to drop down its output torque according to engine operating conditions while the automatic transmission is carrying out a gear shift, the shift control system delays commencement of unlocking of the second specific hydraulically operated frictional element relative to commencement of locking of the first specific hydraulically operated frictional element during the specified gear shift only when not performing the torque down control or when an engine output torque is large.

This shift control system comprises a hydraulic circuit including a plurality of solenoid valves related to the first and second specific hydraulically operated frictional elements. These solenoid valves are selectively energized or turned on and de-energized or turned off by the control means so as to selectively supply hydraulic pressure to and discharge hydraulic pressure from the first and second specific hydraulically operated frictional elements. The delay of commencement of unlocking of the second specific hydraulically operated frictional element relative to commencement of locking of the first specific hydraulically operated frictional element is achieved by delaying the selective energization and de-energization of the solenoid valves.

According to the above configuration, when engine output is large, the transfer of torque from the second specific frictional element to the first specific frictional element is conducted in a state where locking pressure of both first and second specific frictional elements is comparatively large by delaying the commencement of unlocking of the second specific frictional element relative to the commencement of locking of the first specific frictional element with use of a delay means. Consequently, despite the large input torque to the transmission mechanism, racing of the engine is prevented. Moreover, in the reverse situation wherein engine output is small, unlocking of the second specific frictional element is quickened relative to locking of the first specific frictional element, and the transfer of torque is conducted in a state where a locking pressure of both first and second specific frictional elements is comparatively small. Consequently, in this case, despite the small input torque, the drop in output torque to the drive wheels and a shift shock due to the output torque drop are prevented.

In the case where no torque-down control of an engine is conducted during gear shifting, as in the case where the engine output is large, the racing of engine is prevented by delaying commencement of unlocking of the second specific frictional element relative to commencement of locking of the first specific frictional element with use of a delay means. In the reverse situation, wherein torque-down control is conducted, that is, in the case where engine output becomes small during gear shifting, the gear shift control is inhibited, causing a relatively quickened unlocking action of the second specific frictional element, thereby preventing a drop in engine output torque to the drive wheels and a shift shock due to the engine output torque down.

Moreover, since the timing adjustment of unlocking of the second specific frictional element relative to the locking of the first specific frictional element is conducted with use of a shift valve installed in the hydraulic circuit, the hydraulic circuit is prevented from being more complex or larger in size occurs in the case where an extra means, such as a separate timing valve, is installed.

BRIEF DESCRIPTION OF THE DRAWINGS

The above and other objects and features of the present invention will be clearly understood from the following description of a preferred embodiment thereof when considered in conjunction with the accompanying drawings, in which.

DETAILED DESCRIPTION OF PREFERRED EMBODIMENT

Figure 1:
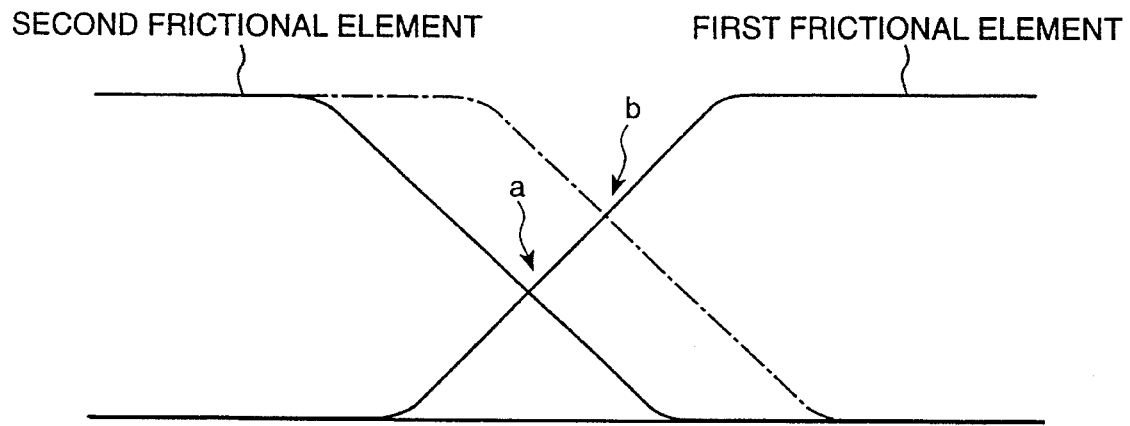
FIG. 1 is a diagram for illustrating a drawback of the prior art.
Figure 2:
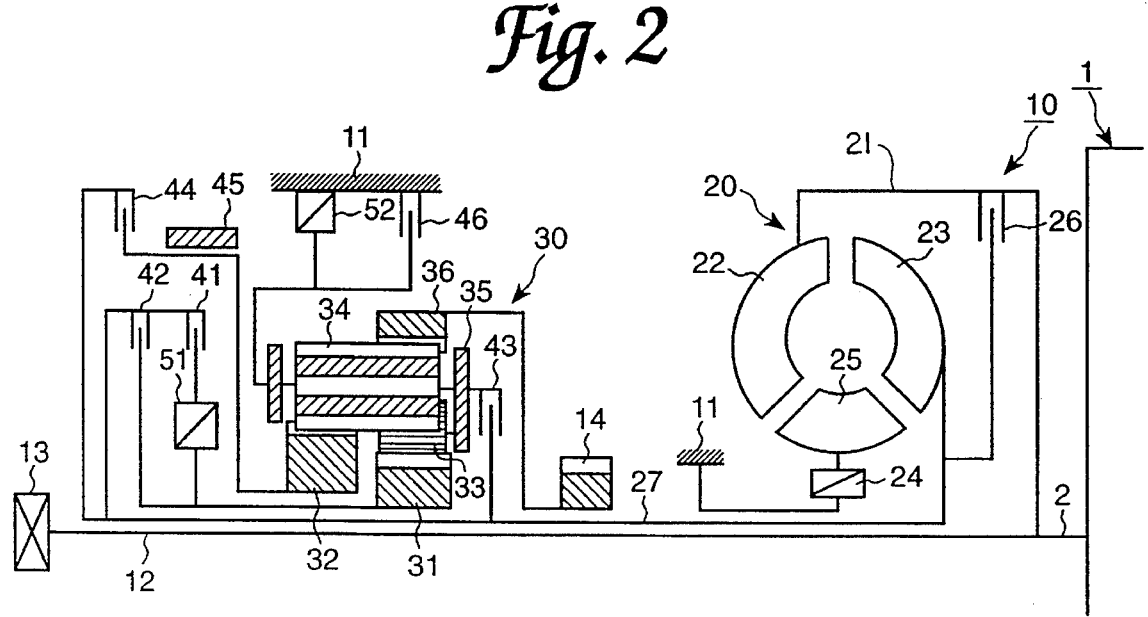
FIG. 2 is a schematic illustration of an automatic transmission with which a shift control system in accordance with a preferred embodiment of the present invention cooperates.

Referring to the drawings in detail and, in particular, to FIG. 2, an automatic transmission 10 in accordance with a preferred embodiment of the present invention includes, as its main components, a torque converter 20, a transmission gear mechanism 30 which is driven by the output from the torque converter 20, a plurality of frictional elements 41 to 46, such as brakes and clutches, which are selectively locked and unlocked to switch torque transmission paths of the transmission gear mechanism 30, and one-way clutches 51 and 52.

The torque converter 20 is composed of a pump 22 fixed inside a case 21 which is fixedly connected to an output shaft 2 of the engine 1, such as a crankshaft, a turbine 23, driven with hydraulic oil by the pump 22 and arranged opposite the pump 22, a stator 25, disposed between the pump 22 and turbine 23, which is supported by the transmission case 11 through the one-way clutch 24 and conducts multiplication of torque, and a lock-up clutch 26, arranged between the case 21 and turbine 23 and directly connecting the engine output shaft 2 to the turbine 23 via the case 21. The rotation of turbine 23 is transmitted to the transmission gear mechanism 30 via a turbine shaft 27. Here, a pump shaft 12, passing through the interior of turbine shaft 27, connects to the engine output shaft 2. An oil pump 13, installed in the rear end part of the automatic transmission 10, is driven by the pump shaft 12.

On the other hand, the transmission gear mechanism 30 is composed of a Labinio type planetary gear set having a small sun gear 31 which is fitted onto the turbine shaft 27, a large sun gear 32, having a diameter larger than small sun gear 31, which is similarly fitted onto the turbine shaft 27 behind the small sun gear 31, a plurality of short pinion gears 33 in mesh with the small sun gear 31, a long pinion gear 34 with its front half in mesh with the short pinion gear 33 and its rear half in mesh with the large sun gear 32, a carrier 35, by which the short and long pinion gears 33 and 34 are supported for rotation, and a ring gear 36 in mesh with the long pinion gear 34.

A forward clutch (FW CLT) 41 and a first one-was clutch 51 are interposed in parallel with respect to and between the turbine shaft 27 and small sun gear 31. A coast clutch (CS CLT) 42 is arranged in parallel to these one-way clutches 41 and 51, and a 3–4 clutch (3–4 CLT) 43 is interposed between the turbine shaft 27 and carrier 35. Further, a reverse clutch (RV CLT) 44 is interposed between the turbine shaft 27 and large sun gear 32, and a 2–4 brake (2–4 BRK) 45, consisting of a band brake, is provided between the large sun gear 32 and reverse clutch 44 so as to fix in place the large sun gear 32 when activated or locked. Between the carrier 35 and transmission case 11 there are provided a second one-way clutch 52, which is designed and adapted to catch a reaction force from the carrier 35, and a low reverse brake (LR BRK) 46, which fixes in place the carrier 35, in parallel to each other. The ring gear 36 is connected to an output gear 14 so as to transmit driving torque to left and right drive wheels (not shown) via a differential (not shown).

In this instance, the automatic transmission 10 enables selections of the ranges of park (P), reverse (R), neutral (N), drive (D), second (S) and low (L) by manipulation of a shift lever (not shown), and automatic selections, in the forward ranges of drive (D), second (S) and low (L), of among 1st and 4th gears, among 1st and 3rd gears, and among 1st and 2nd gears, respectively. Table I shows the selectively locked and unlocked states of the frictional elements 41 to 46, which are clutches and brakes, and the first (1ST) and second (2ND) one-way clutches 51 and 52 for each range and each gear.

TABLE I

| Range & Gear | FW CLT (41) | CS CLT (42) | 3-4 CLT (43) | RV CLT (44) | 2-4 BRK (45) | LR BRK (46) | OW-CLT 1ST | OW-CLT 2ND |
|---|---|---|---|---|---|---|---|---|
| P | | | | | | | | |
| R | | | | o | | o | | |
| N | | | | | | | | |
| D 1ST | o | | | | | | o | o |
| D 2ND | o | | | | o | | | o |
| D 3RD | o | o | o | | | | | o |
| D 4TH | o | | o | | o | | | |
| S 1ST | o | | | | | | o | o |
| S 2ND | o | o | | | o | | | o |
| S 3RD | o | o | o | | | | | o |
| L 1ST | o | o | | | | o | o | o |
| L 2ND | o | o | | | o | | | o |

Figure 3:
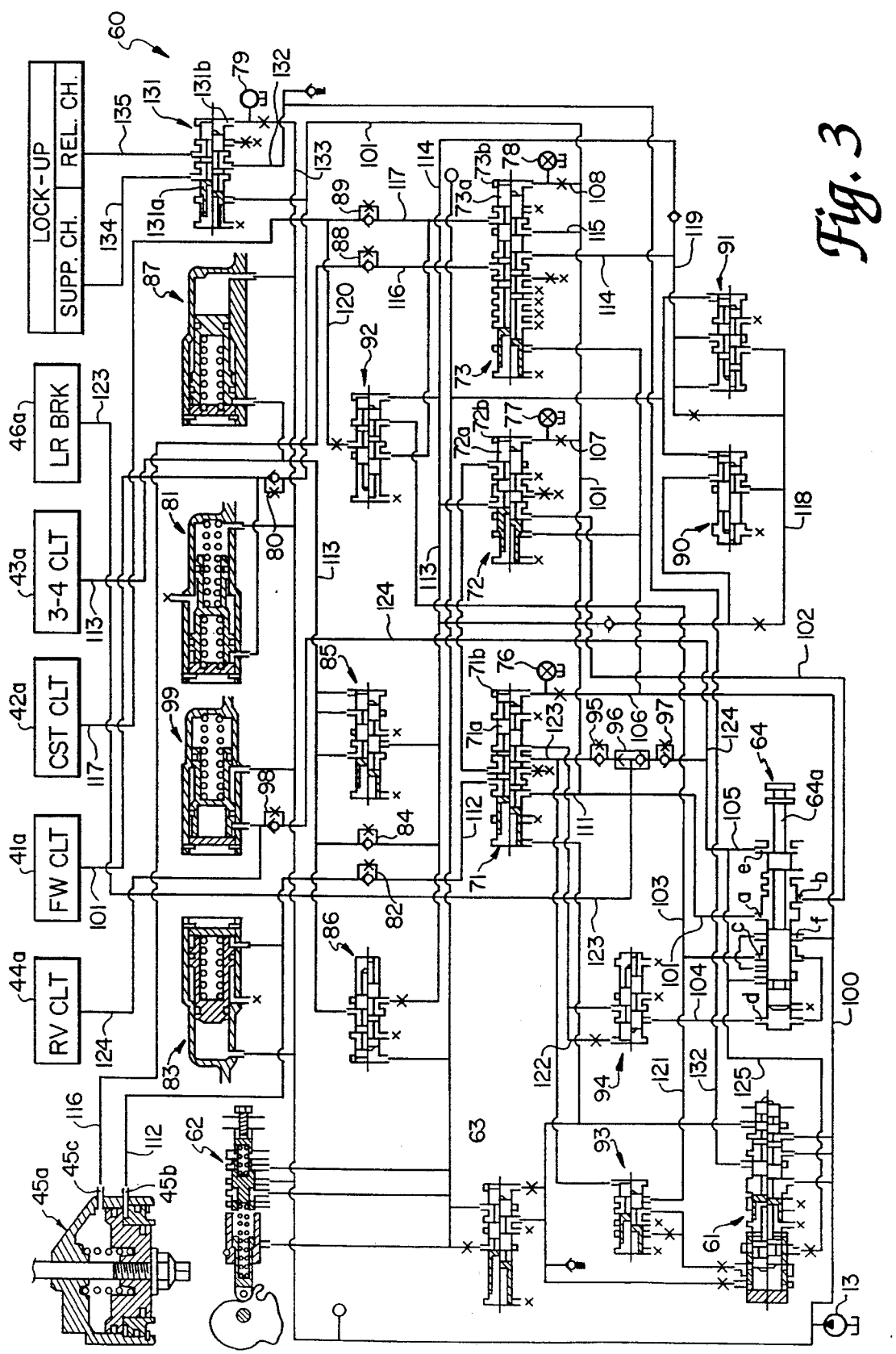
FIG. 3 is a diagram of a hydraulic circuit of the shift control system.

Referring to FIG. 3, a hydraulic circuit 60 for supplying and releasing hydraulic oil relative to hydraulic actuators 41a to 46a which respectively operate the frictional elements 41 to is shown. Among the hydraulic actuators 41a to 46a, the hydraulic actuator 45a assigned to the 2–4 brake 45 is composed of a servo piston having an apply port 45b and a release port 45c. When the 2–4 brake 45 is supplied with hydraulic oil only at the apply port 45b, it causes the 2–4 brake 45 to be engaged or locked. When the brake 45 is not supplied with hydraulic oil at the apply port 45b or at the release port 45c, is supplied with hydraulic oil at both apply port 45b and release port 45c, and is supplied with hydraulic oil only at the release port 45c, the 2–4 brake 45 is released or unlocked. The other actuators 41a to 44a and 46a are composed of ordinary hydraulic pistons and, when hydraulic oil is supplied thereto, the respectively related frictional elements 41 to 44 and 51 and 52 are engaged or locked.

This hydraulic circuit 60 is provided with a regulator valve 61, for adjusting the pressure of the hydraulic oil which is discharged from the oil pump 13 to a main pressure line 100 to a specified pressure line pressure, and a throttle valve 62, for generating a throttle pressure corresponding to throttle openings of the engine. After this throttle pressure has been regulated by a throttle modulator valve 63, it is further regulated by the regulator valve 61, so as to adjust the line pressure from the main pressure line 100 corresponding to the throttle opening of engine. In this hydraulic circuit 60 there is furnished a manual valve 64 for selectively feeding the line pressure to each hydraulic pressure line cooperating with the selected range, and with first to second (1–2), second to third (2–3) and third to fourth (3–4) shift valves 71, 72 and 73, which are caused, according to the selected gears, to selectively supply the line pressure to the hydraulic actuators 41a to 46a. The manual valve 64 has an input port f through which the line pressure is introduced from the main pressure line 100 and first to fifth output ports a to e. As a result of the slide movement of a spool 64a, accompanying the manipulation of the shift lever by the driver, the input port f communicates with the first and second output ports a and b in the drive (D) range, with the first, second and third output ports a, b and c in the second (S) range, with the first, third and fourth output ports a, c and d in the low (L) range, and with the fifth output port e in the reverse (R) range. The first to fifth output pressure lines 101 to 105 are respectively connected to these output ports a to e.

The first-to-second (1–2), second-to-third (2–3) and third-to-fourth (3–4) shift valves 71, 72 and 73 are designed to urge their spools 71a, 72a and 73a toward the right position, as viewed in FIG. 3, respectively, with use of springs (not shown). These spools 71a, 72a and 73a are provided on the right side ends with control ports 71b, 72b and 73b, respectively. A first pressure control line 106, branching off from the main pressure line 100, is connected to the control port 71b of the first to second (1–2) shift valve 71, while the second and third pressure control lines 107 and 108, branching off from the first output pressure line 101, are respectively connected to the control ports 72b and 73b of the second to third (2–3) and third to fourth (3–4) shift valves 72 and 73. First, second and third solenoid valves 76, 77 and 78, which are used in shifting gears, are respectively installed in these pressure control lines 106, 107 and 108.

When these solenoid valves 76 to 78 are de-energized or turned OFF, control pressure is introduced into the control ports 71b to 73b of the related shift valves 71 to 73, respectively, and the spools 71a to 73a are positioned in their left end positions from the standpoints shown in FIG. 3. When they are energized or turned ON, control pressure is drained from the control ports 71b to 73b. Then, the spools 71a to 73a are positioned in their right end positions.

Figure 4:
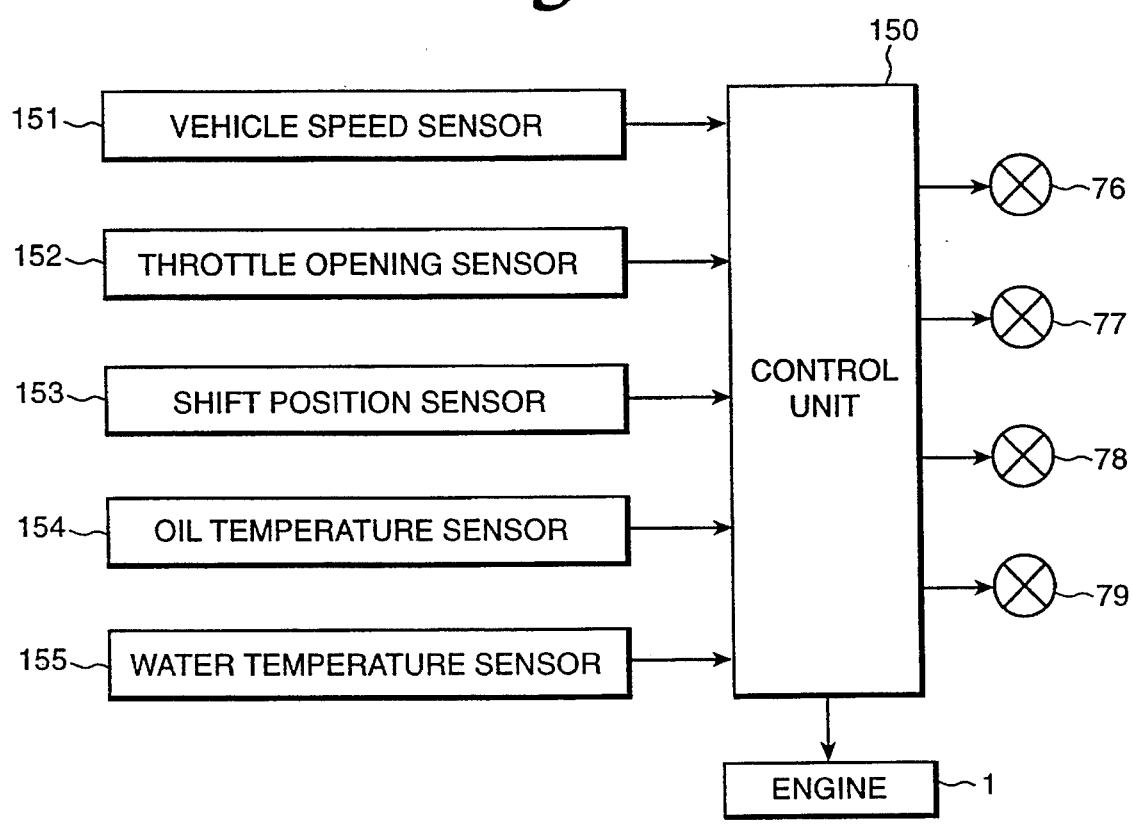
FIG. 4 is a block diagram of a control system.

These solenoid valves 76 to 78 are turned ON or OFF corresponding to a selected gear, to which the automatic transmission 10 is set, by a signal from a control unit 150, as shown in FIG. 4. To this control unit 150 are inputted various signals, such as a vehicle speed signal from a vehicle speed sensor 151 representative of the speed of vehicle, a throttle opening signal from a throttle opening sensor 152 representative of the opening of an engine throttle, a shift range signal from a shift position sensor 153 representative of the range selected by the shift lever, a temperature signal from an oil temperature sensor 154 representative of the temperature of hydraulic oil in the automatic transmission 10, and a water temperature signal from a water temperature sensor 155 representative of the temperature of cooling water in the engine. According to driving conditions detected based on these signals, an appropriate gear is established, and ON/OFF signals are outputted to the respective solenoid valve 76 to 78 so as to attain the gear. In this case, ON/OFF patterns of the solenoid valves 76 to 78 are selected according to the ranges and gears as shown in Table II. In Table II, what is indicated by OFF(ON) at the third speed gear (3RD) is that the first solenoid valve 76 is turned OFF during a second- to-third (2–3) shifting and turned ON after the second-to-third (2–3) shifting.

TABLE II

| | D RANGE | | | | S RANGE | | | L RANGE | |
|---|---|---|---|---|---|---|---|---|---|
| | 1ST | 2ND | 3RD | 4TH | 1ST | 2ND | 3RD | 1ST | 2ND |
| 1ST SLV (76) | OFF | ON | OFF(ON) | ON | OFF | ON | OFF(ON) | OFF | ON |
| 2ND SLV (77) | ON | ON | OFF | OFF | ON | ON | OFF | ON | ON |
| 3RD SLV (78) | ON | ON | OFF | ON | ON | OFF | OFF | OFF | OFF |

As will be discussed in detail later, since the control unit 150 operates the lock-up clutch 26 of torque converter 20 according to driving conditions, an ON/OFF signal is also outputted to the lock-up solenoid valve 79 provided in the hydraulic circuit 60.

This control unit 150 also performs the control of engine 1, which forms a part of the power plant together with the automatic transmission 10. In particular, upon a shifting of automatic transmission 10, when the oil temperature and water temperature indicated by the signals from the oil temperature sensor 154 and water temperature sensor 155 are adequately high and the engine 1 and automatic transmission 10 are adequately warmed up, while the opening of the engine throttle indicated by the signal from the throttle opening sensor 152 is large and the input torque to the automatic transmission 10 is large, a torque-down control, in which lowering of the engine output torque is performed, is conducted by, for example, reducing the supplying quantity of fuel.

On the other hand, among the first to fifth output pressure lines 101 to 105 connected to the respective output ports a to e of the manual valve 64, the first pressure output line 101, which is in communication with the main pressure line 100 in each of the forward ranges, i.e. the drive range (D), the second range (S) and the low range (L), is led to the actuator 41a of the forward clutch 41 via a one-way orifice 80 which throttles hydraulic oil in the direction of oil supply. Consequently, in each of the drive range (D), the second range (S) and the low range (L), the forward clutch 41 is always engaged or locked. In this hydraulic circuit 60, an N-D accumulator 81, used as a buffer during forward clutch engagement or locking, is provided in the first pressure output line 101.

Pressure line 111 branches off from this first pressure output line 101 and is led to the 1–2 shift valve 71. Moreover, when the first solenoid valve 76 is energized or turned ON and the spool 71a of the 1–2 shift valve 71 has moved to the right end position, this branch pressure line 111 is brought into communication with the servo-pressure apply line 112, and leads to the apply port 45b of servo-piston 45a via a one-way orifice 82 for throttling hydraulic oil in the direction of oil supply. Consequently, when the first solenoid valve 76 is energized or turned ON in each of the drive range (D), the second range (S) and the low range (L), that is, at the 2nd gear and at 4th gear in the drive range (D), at 2nd gear in the second range (S), and at 2nd gear in the low range (L), servo-apply pressure is introduced into the 2–4 brake at the apply port 45b. Further, in the hydraulic control circuit 60, there is provided a first-to-second (1–2) accumulator 83 which serves as a buffer during the locking or engagement of servo-piston, namely the 2–4 brake, in the servo-pressure apply line 112.

Moreover, the second pressure output line 102, which is brought into communication with the main pressure line 100 in the drive range (D) and second range (S), leads to the 2–3 shift valve 72. When the second solenoid valve 77 is de-energized or turned OFF and the spool 72a of the 2–3 shift valve 72 is shifted to the left end position, the pressure output line 102 is brought into communication with a 3–4 clutch pressure line 113 so as to lead to the actuator 43a of the 3–4 clutch 43 via a one-way orifice 84 for throttling hydraulic oil in the direction of oil supply. Consequently, when the second solenoid valve 77 is turned OFF in the drive range (D) and second range (S), that is, at the 3rd gear and 4th gear in the drive range (D) and at 3rd gear in the second range (S), the 3–4 clutch 43 is engaged or locked. A bypass valve 85 and a 2–3 timing valve 86 are provided in the 3–4 clutch pressure line 111 in parallel with respect to the one-way orifice 84. By means of the valves 85 and 86, a timing at which the 3–4 clutch 43 is engaged or locked is regulated. In addition, a 2–3 accumulator 87, which serves as a buffer during the engagement of 3–4 clutch, is provided in the 3–4 clutch pressure line 113.

A pressure line 114, which branches off from the 3–4 clutch pressure line 113, and a pressure line 115, which branches off from the first pressure output line 101, are led to the 3–4 shift valve 73. When the third solenoid valve 78 is de-energized or turned OFF and the spool 73a of the 3–4 shift valve 73 is shifted to the left end position, the pressure line 114 is brought into communication with the servo-release pressure line 116 so as to lead to the release port 45c of the servo-piston 45a via the one-way orifice 88. On the other hand, the pressure line 115 is brought into communication with the coast clutch pressure line 117 so as to lead to the actuator 42a of the coast clutch 42 via a one-way orifice 89 for throttling hydraulic oil in the direction of oil supply. Accordingly, when the second and third solenoid valves 77 and 78 are both de-energized or turned OFF in the drive range (D) and second range (S), i.e., at 3rd gear in the drive range (D) and at 3rd gear in the second range (S), servo-release pressure is introduced into the servo-piston 45a at release port 45c, so as to release or unlock the 2–4 brake 45. On the other hand, when the third solenoid valve 78 is de-energized or turned OFF in each of the drive range (D), second range (S) and low range (L), i.e., at the 3rd gear in the drive range (D), at the 2nd and 3rd gears in the second range (S), and at 1st and 2nd gears in the low range (L), the coast clutch 42 is engaged or locked.

In the hydraulic circuit 60, there are further provided a 3–2 timing valve 90, which regulates a timing at which the discharge of servo-release pressure and 3–4 clutch pressure is conducted, and a 3–2 capacity valve 91 arranged between a pressure line 118 branching off from the 3–4 clutch pressure line 113 and a pressure line 119 branching off from the pressure line 114. Further, a bypass pressure line 120 bypassing the one-way orifice 89 is provided in the coast clutch pressure line 117, and a 3–4 capacity valve 92 is provided on top of the pressure line 120 in order to open and block it and to adjust a timing at which discharge of the coast clutch pressure is conducted. A pressure line 121, branching off from the third pressure output line 103, is led to the pressure intensifying port of the regulator valve 61 via a throttle back-up valve 93 so as to intensify the line pressure in the second range (S) and low range (L). Furthermore, the fourth pressure output line 104, which is brought into communication with the main pressure line 100 in the low range (L) by the manual valve 64, leads to the 1–2 shift valve 71 via a low reduce valve 94 and a pressure line 122. When the first solenoid valve is de-energized or turned OFF and, as a result, the spool 71a of the 1–2 shift valve 71 is shifted to the left end position, this pressure line 122 is brought into communication with a low reverse brake pressure line 123 so as to lead to the actuator 46a of the low reverse brake 46 via a one-way orifice 95, which throttles hydraulic pressure in the direction of oil discharge, and a shuttle valve 96. Consequently, when the first solenoid valve 76 is de-energized or turned OFF in the low range (L), i.e. at the 1st gear in the low range (L), the low reverse brake 46 is engaged or locked.

The fifth pressure output line 105, which is brought into communication with the main pressure line 100 in the reverse range (R), communicates with a low reverse brake pressure line 123 via a one-way orifice 97 for throttling hydraulic pressure in the direction of oil discharge and the shuttle valve 96. In addition, a reverse clutch pressure line 124, branching off from the fifth pressure output line 105, leads to the actuator 44a of the reverse clutch 44 via a one-way orifice 98 for throttling hydraulic pressure in the direction of oil supply. Consequently, in the reverse range (R), the low reverse brake 46 and the reverse clutch 44 are continuously engaged or locked.

The reverse clutch pressure line 124 is also provided with an accumulator 99 which serves as a buffer during reverse clutch engagement. A pressure line 125, branching off from the fifth pressure output line 105, leads to the pressure intensifying port of the regulator valve 61 so as to intensify the line pressure in the reverse range (R). In addition to the above configuration, a lock-up valve 131 is provided in the hydraulic circuit 60 for actuating the lock-up clutch 26 in the torque converter 20. A torque converter pressure line 132 leads from the regulator valve 61 to the lock-up valve 131, and a control pressure line 133 leads from the main pressure line 100 and is connected to the control port 131b at one end of the lock-up valve 131. When the lock-up solenoid valve 79 provided in the control pressure line 133 is energized or turned ON by a signal from the control unit 150, the control pressure in the control port 131b of the lock-up valve 131 is drained, so as to shift the spool 131a to the right end position, with the result that the torque converter pressure line 132 is brought into communication with the pressure line 134 leading to a lock-up chamber in the torque converter 20, thereby locking the lock-up clutch 26. On the other hand, when the solenoid valve 79 is de-energized or turned OFF and, as a result, the spool 131a of the lock-up valve 131 is shifted to the left end position with the introduction of control pressure into the control port 131b, the torque converter pressure line 132 is brought into communication with the pressure line 135 leading to an unlock or release chamber, thereby unlocking or releasing the lock-up clutch 26.

Figure 5:
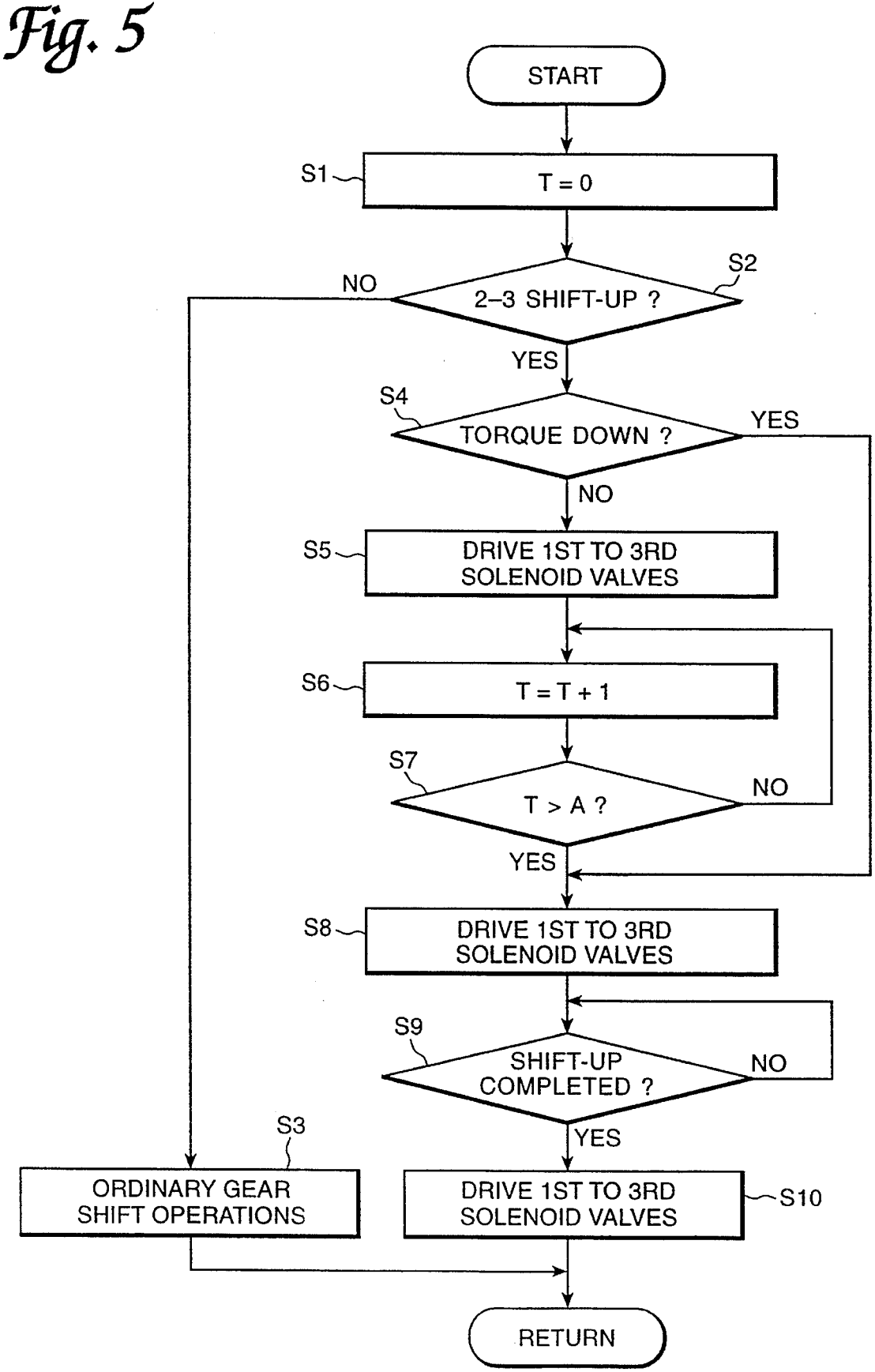
FIG. 5 is a flow chart illustrating a shift control sequence.
Figure 6:
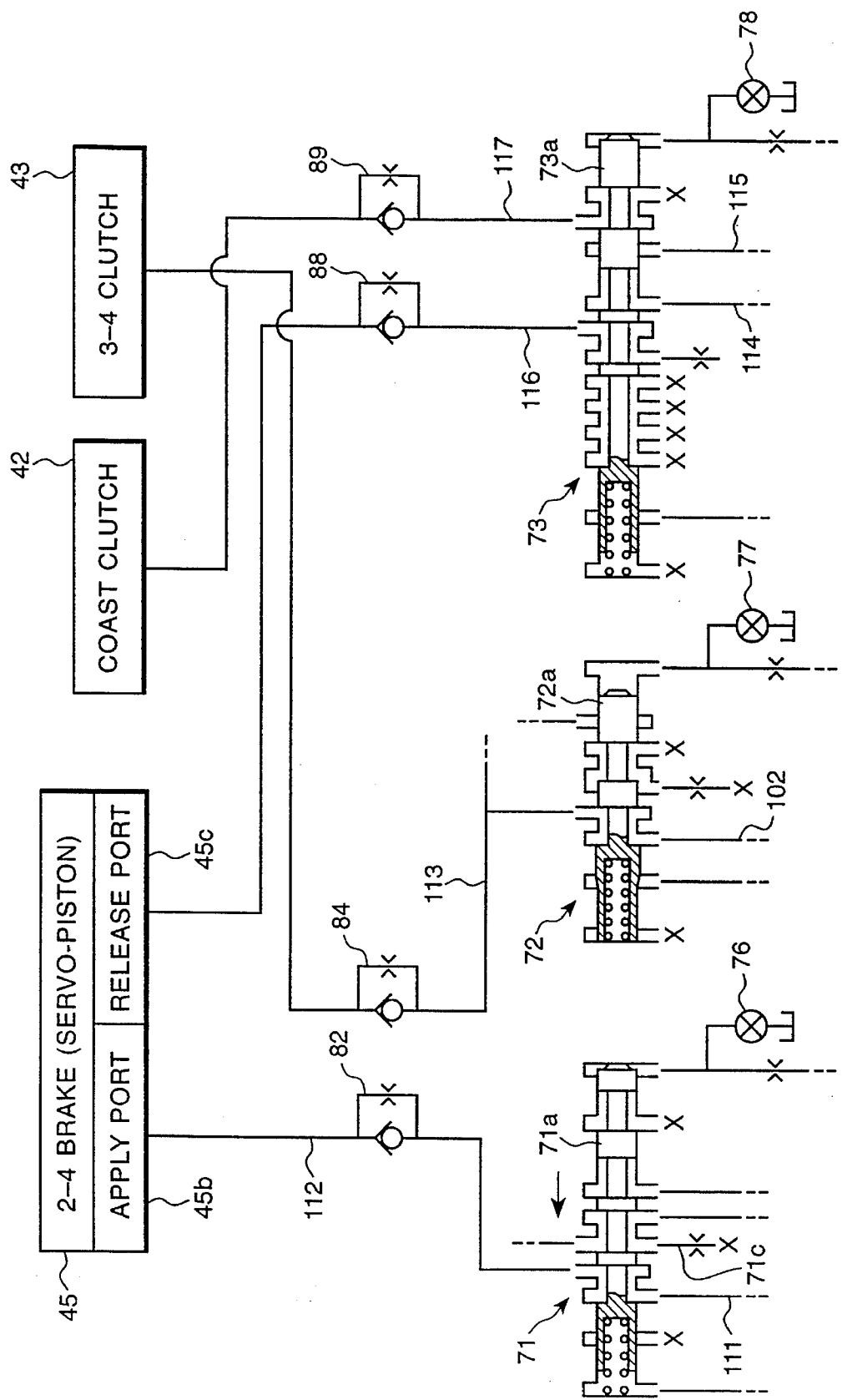
FIG. 6 is an enlarged diagram showing an essential part of the hydraulic circuit in which shift valves are controlled so as to delay the commencement of discharge of hydraulic pressure from a 2–4 brake from the commencement of supply of hydraulic pressure to a 3–4 clutch.
Figure 7:
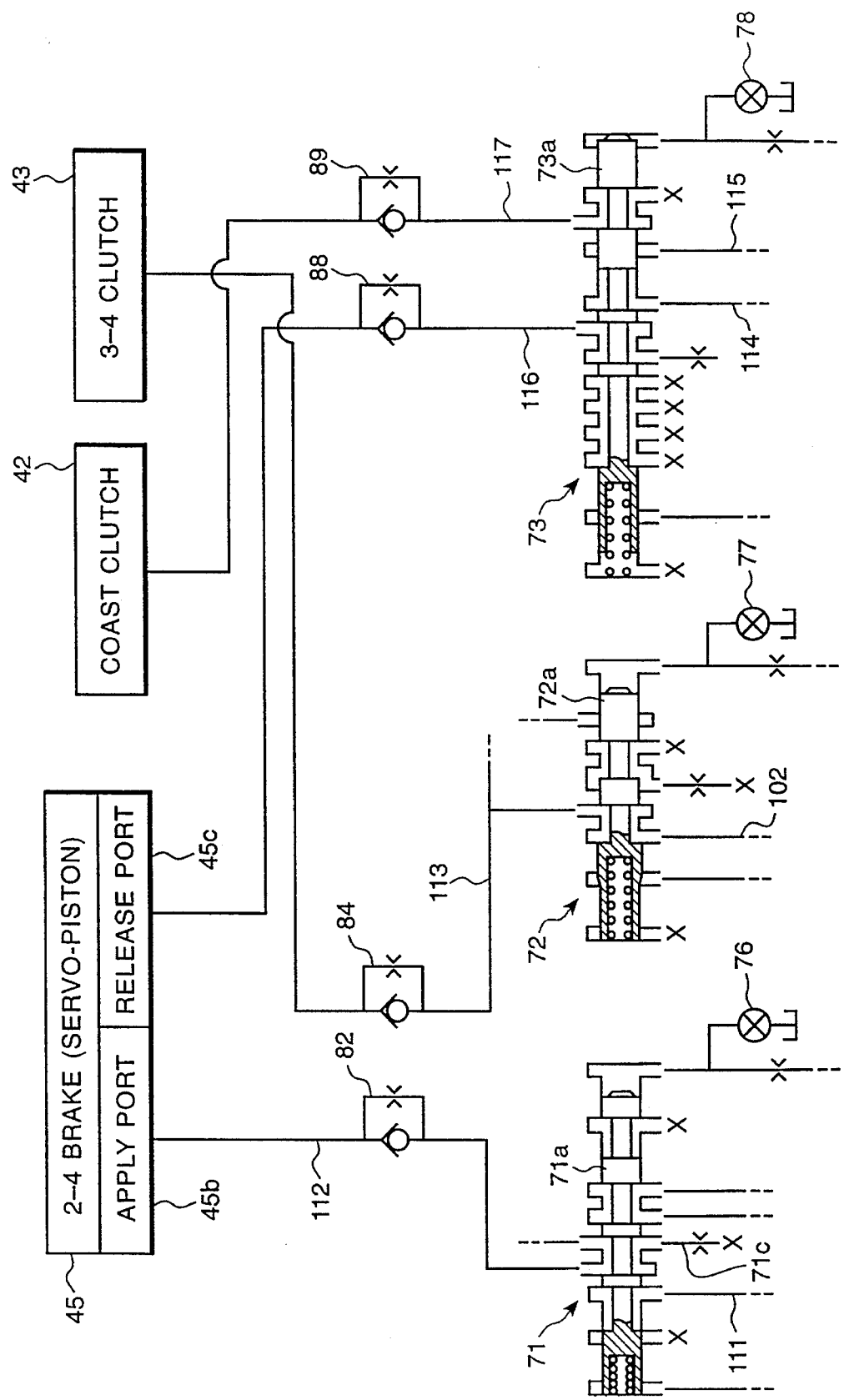
FIG. 7 is an enlarged diagram showing an essential part of the hydraulic circuit in which shift valves are controlled so as to commence the discharge of hydraulic pressure to the 2–4 brake simultaneously with the commencement with the supply of hydraulic pressure to the 3–4 clutch.
Figure 8:
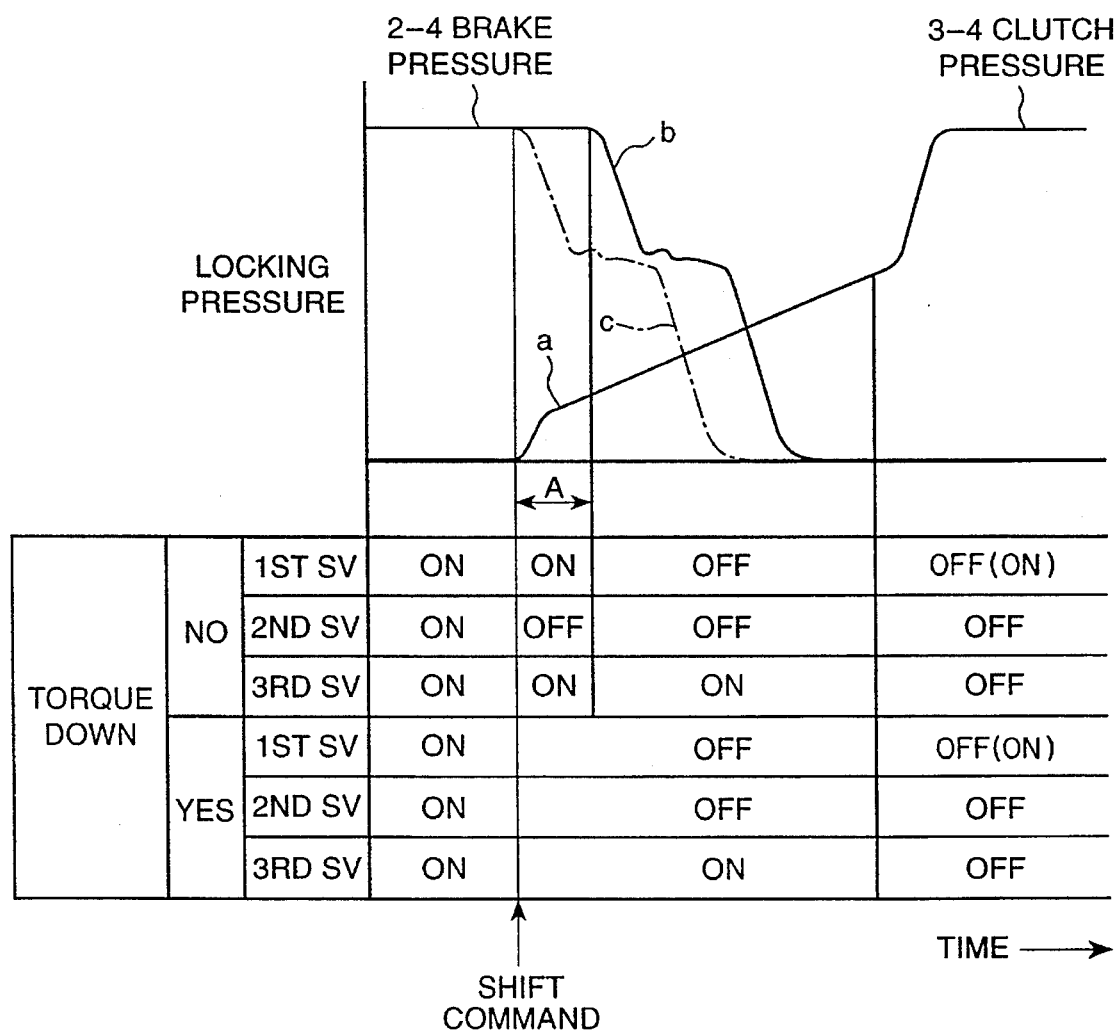
FIG. 8 is a time chart illustrating operations of the shift valves.

The operation of the shift control system depicted in FIGS. 2 to 4 is best understood by reviewing FIG. 5 in conjunction with FIGS. 6 to 8, which are flow charts illustrating a gear shift control routine. The following description is directed especially to, for instance, a second-to-third shift-up in which one of two frictional elements is locked or engaged while the other is simultaneously unlocked or released.

As is clear from Table I, when conducting a 2–3 shift-up, the 3–4 clutch 43 is engaged or locked while the 2–4 brake 45 is simultaneously released or unlocked, and, in the drive range (D), the coast clutch 42 is engaged or locked. In order to execute this shift-up operation in the drive range (D), as is clear from Table II, the control unit 150 outputs ON/OFF signals to the first to third shift solenoid valves 76 to 78 in such a way that the solenoid valves 76 to 78 are switched from their ON states to their OFF states (only the first solenoid valve 76 is switched again to its ON state after termination of the 2–3 shift-up). At this time, in order to regulate a time at which the 2–4 brake 45 is initiated to be locked, the control unit 150 executes a sequential control.

When the sequence commences, control passes directly to step S1 where a time count T is cleared. Then, in step S2, based on signals from the respective sensors 151–155, a decision is made as to whether there has developed a driving condition for 2–3 shift-up If the answer to the decision is "NO" then this indicates that the current drive condition is inadequate for conducting a 2–3 shift-up. Then, another type of shift appropriate for the drive condition is executed in an ordinary manner in step S3.

On the other hand, if the answer to the decision made in step S2 is "YES," then this indicates that the current driving condition is such that a 2–3 shift-up must be conducted. Then, a decision is made based on a signal representative of the throttle opening in step S4 as to whether torque-down control of the engine 1 is essential for the gear shift to be conducted. When torque-down control is not required, then, in step S5, solenoid control signals (ON/OFF signals) are outputted as shift commands so as to turn the first to third solenoid valves 76 to 78, now in their ON states at the 2nd gear, to ON, OFF and ON states, respectively. In short, only the second solenoid valve 77 is turned from its ON state to its OFF state. As is shown in FIG. 6, with regard to the hydraulic circuit 60, only the spool 72a of the 2–3 shift valve 72 is shifted to its left end position from its right end position, while the spools 71a and 73a of the 1–2 and 3–4 shift valves 71 and 73 remains in their right end positions. As a result, 3–4 clutch lock pressure is supplied to the actuator 43a of 3–4 clutch 43 through the 3–4 clutch pressure line 113 from the pressure line 102 via the 2–3 shift valve 72 and one-way orifice 84. In this way, as indicated by a character "a" in FIG. 8, when there has been a shift command, the supply of 3–4 clutch lock pressure commences prior to the commencement of discharge of 2–4 brake unlock pressure.

Subsequently, after changing the counted timer T by one increment in step S6, a decision is made in step S7 as to whether or not a specified count A, which is specifically representative of a time, has been reached by the counted T. Immediately after the counted time T has reached the specified count A, solenoid control signals (ON/OFF signals) are provided so as to bring the first to third solenoid valves 76 to 78 into OFF, OFF and ON states. Only the first solenoid valve 76 is turned from its ON state to its OFF state. As a result, the spool 71a of the 1–2 shift valve 71 is shifted from its right end position shown in FIG. 6 to its left end position, so that the servo-apply pressure, which had been supplied to the apply port 45b of actuator 45a for the 2–4 brake 45, is then discharged from the drain port 71c of 1–2 shift valve 71. In this way, as indicated by a character b in FIG. 8, the discharge of servo-apply pressure commences after the elapse of the specified time A from the output of the shift command, that is, from the commencement of supply of the 3–4 clutch lock pressure. In other words, the commencement of unlocking of the 2–4 brake 45 is delayed by the specified time A from the commencement of locking of the 3–4 clutch 43. As a result, since torque-down control of the engine 1 is not executed, during the 2–3 shift-up under the condition where the input torque to the automatic transmission 10 is large, the transfer of torque from the 2–4 brake 45 to the 3–4 clutch 43 is conducted in a condition in which the locking pressure of both 2–4 brake 45 and 3–4 clutch 43 is comparatively large. In this way, in spite of the large input torque, the racing in rotation of the engine 1 is prevented.

On the other hand, during the 2–3 shift-up, in the case where torque-down control of engine 1 is conducted, control directly passes from step S4 to step S8 where solenoid control signals (ON/OFF signals) are provided so as to turn the first to third solenoid valves 76 to 78 from their ON states in the 2nd gear to their OFF, OFF and ON states, respectively. That is, the first and second solenoid valves 76 and 77 are turned to their OFF states from their ON states, while the third solenoid valve 78 remains in its ON state.

As a result, as shown in FIG. 7, the spool 71a of the 1–2 shift valve 71 and the spool 72a of the 2–3 shift valve 72 are shifted from their right end positions to their left end positions, so as to discharge the servo-apply pressure, which has been supplied to the apply port 45b of actuator 45a for the 2–4 brake 45, from the 1–2 shift valve 71 through the drain port 71c. Simultaneously, 3–4 clutch lock pressure is supplied to the actuator 43a for the 3–4 clutch 43 from the pressure line 102 via the 2–3 shift valve 72, the one-way orifice 84 and the pressure line 113. Consequently, as indicated by the characters a and c, when there has been a shift command, the discharge of 2–4 brake pressure commences at the same time as the supply of 3–4 clutch pressure commences. In this way, because the commencement of release operation of the 2–4 brake 45 becomes quicker than when torque-down control is not conducted, during the 2–3 shift-up while executing the torque-down control in which only a small torque is inputted to the automatic transmission 10, the transfer of torque from the 2–4 brake 45 to the 3–4 clutch 43 is conducted in the condition where the locking pressure of the 2–4 brake 45 to the 3–4 clutch 43 is comparatively small. Consequently, in spite of the small input torque, a drop in the output torque transmitted from the automatic transmission 10 to the drive wheels and a shift shock due to the output torque drop are suppressed.

In the manner described above, the 2–3 shift-up operation accompanying the control of the release timing of 2–4 brake 45 according to the execution or non-execution of torque-down control is terminated. This termination of the 2–3 shift-up is judged on the basis of a gear ratio or the like at step S9. This decision is repeated until the termination of the 2–3 shift-up is confirmed. Then, solenoid control signals (ON/OFF signals) are provided in step S10 so as to turn the first to third solenoid valves 76 to 78 to their OFF states for creating the 3rd gear. In short, only the third solenoid valve 78 is turned from its ON state to its OFF state so as to shift the spool 73a of the 3–4 shift valve 73 to the left end position, thereby supplying servo-release pressure and coast clutch pressure to the release port 45c of the servo-piston 45a and the actuator 42a for the coast clutch 42, respectively, from the pressure lines 114 and 115 via the pressure lines 116 and 117, respectively. The 2–4 brake 45 is thereby fixed in an unlocked condition, and the coast clutch 42 is locked.

In this instance, simultaneous with or immediately after the terminating operation of 2–3 shift-up, the first solenoid valve 76 is turned again to its ON state so as to shift the spool 71a of the 1–2 shift valve 71 to the right end position, thereby supplying servo-apply pressure again. At this time, however, there is no engagement of the 2–4 brake 45 because of supplying of servo-release pressure as described above.

Although the timing of commencement of 2–4 brake release operation is adjusted according to whether or not torque-down control of the engine 1 is to be performed during shifting, nevertheless, for engines whose output torque is not down-controlled, it is adjusted according to engine output torque during shifting.

The gear shift control system for an automatic transmission causes the transmission to shift to a specified gear shift by conducting locking of a first frictional element simultaneously with unlocking of a second frictional element. When engine output is large and torque-down control of an engine is not conducted, the time of commencement of unlock operation of the second frictional element is delayed relative to the time of commencement of lock operation of the first frictional element during the specified gear shifting. As a result, the transfer of torque from the second frictional element to the first frictional element is conducted in a condition where the locking pressure for the first and second frictional elements is comparatively large. Consequently, in this case, despite the large input torque to the transmission mechanism, racing of the engine is prevented.

In a reverse condition, where engine output is small and torque-down control of an engine is conducted, the unlocking operation of the second frictional element is made quicker relative to the locking operation of the first frictional element, so that the transfer of torque is conducted in a condition where the locking pressure for the first and second frictional elements is comparatively small. Thus, despite the small input torque to the transmission mechanism, a drop in output torque from the transmission to the drive wheels and a shift shock due to the output torque drop are prevented.

It is to be understood that although the present invention has been described in detail with respect to a specific embodiment thereof, various other embodiments and variants, which fall within the scope and spirit of the invention, may occur to those skilled in the art. Such other embodiments and variants are intended to be covered by the following claims.

What is claimed is:

1. In a shift control system for an automobile automatic transmission, having a plurality of hydraulically operated frictional elements, for selectively locking and unlocking said hydraulically operated frictional elements to automatically perform gear shifts, and for performing a torque down control for an engine according to engine operating conditions during a gear shift, a specific one of said gear shifts being created by locking a first specific hydraulically operated frictional element of said hydraulically operated frictional elements simultaneously with unlocking a second specific hydraulically operated frictional element of said hydraulically operated frictional elements, the improvement comprising:

control means for delaying commencement of said unlocking of said second specific hydraulically operated frictional element relative to commencement of said locking of said first specific hydraulically operated frictional element during said specific one of said gear shifts only when not performing said torque down control.

2. An improvement as defined in claim 1, wherein said shift control system comprises a hydraulic circuit including a plurality of solenoid valves related to the first and second specific hydraulically operated frictional elements, said control means selectively energizing and de-energizing said solenoid valves so as to selectively supply hydraulic pressure to and discharge hydraulic pressure from said first and second specific hydraulically operated frictional elements, thereby delaying commencement of said unlocking of said second specific hydraulically operated frictional element relative to commencement of said locking of said first specific hydraulically operated frictional element during said specific one of said gear shifts.

3. An improvement as defined in claim 1, wherein said shift control system delays said commencement of said unlocking of said second specific hydraulically operated frictional element for a preselected time from said commencement of said locking of said first specific hydraulically operated frictional element.

4. In a method of gear shift controlling an automobile automatic transmission, having a plurality of hydraulically operated frictional elements, so as to selectively lock and unlock said hydraulically operated frictional elements and automatically perform gear shifts, the improvement comprising:

creating a specific one of said gear shifts by locking a first specific hydraulically operated frictional element of said hydraulically operated frictional elements simultaneously with unlocking a second specific hydraulically operated frictional element of said hydraulically operated frictional elements; and delaying commencement of said unlocking of said second specific hydraulically operated frictional element for a preselected time from commencement of said locking of said first specific hydraulically operated frictional element during said specific one of said gear shifts only when not performing a torque down control.

* * * * *